United States Patent
Pang et al.

(10) Patent No.: US 11,574,502 B2
(45) Date of Patent: Feb. 7, 2023

(54) METHOD AND DEVICE FOR IDENTIFYING FACE, AND COMPUTER-READABLE STORAGE MEDIUM

(71) Applicant: Beijing Xiaomi Pinecone Electronics Co., Ltd., Beijing (CN)

(72) Inventors: Yunping Pang, Beijing (CN); Hai Yao, Beijing (CN); Wenming Wang, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 105 days.

(21) Appl. No.: 17/149,013

(22) Filed: Jan. 14, 2021

(65) Prior Publication Data

US 2021/0406524 A1    Dec. 30, 2021

(30) Foreign Application Priority Data

Jun. 28, 2020 (CN) .......................... 202010600155.4

(51) Int. Cl.
*G06V 40/16* (2022.01)

(52) U.S. Cl.
CPC .......... *G06V 40/172* (2022.01); *G06V 40/165* (2022.01); *G06V 40/171* (2022.01)

(58) Field of Classification Search
CPC .. G06V 40/172; G06V 40/165; G06V 40/171; G06V 10/243; G06V 10/32; G06V 20/30; G06V 40/179; G06V 40/169; G06V 40/16; G06V 40/168; G06F 16/55; G06K 9/6218; G06K 9/6215; G06K 9/6201
See application file for complete search history.

(56) References Cited

U.S. PATENT DOCUMENTS

| | | | |
|---|---|---|---|
| 9,639,740 B2 * | 5/2017 | Ganong | G06Q 30/0241 |
| 2009/0252383 A1 * | 10/2009 | Adam | G06V 40/16 |
| | | | 715/810 |
| 2011/0188713 A1 * | 8/2011 | Chin | G06F 16/583 |
| | | | 382/118 |

(Continued)

FOREIGN PATENT DOCUMENTS

CN    110147710 A    8/2019

OTHER PUBLICATIONS

Extended European Search Report dated Jun. 17, 2021 in European Patent Application No. 211514229, 8 pages.

(Continued)

*Primary Examiner* — Md K Talukder
(74) *Attorney, Agent, or Firm* — Oblon, McClelland, Maier & Neustadt, L.L.P.

(57) ABSTRACT

Aspects of the disclosure can provide method for identifying a face where multiple images to be identified are received. Each of the multiple images includes a face image part. Each face image of face images in the multiple images to be identified is extracted. An initial figure identification result of identifying a figure in the each face image is determined by matching a face in the each face image respectively to a face in a target image in an image identification library. The face images are grouped. A target figure identification result for each face image in each group is determined according to the initial figure identification result for the each face image in the each group.

20 Claims, 8 Drawing Sheets

(56) References Cited

U.S. PATENT DOCUMENTS

| | | | | |
|---|---|---|---|---|
| 2012/0308141 A1* | 12/2012 | Okubo | ............... | G06K 9/6298 |
| | | | | 382/192 |
| 2013/0251217 A1 | 9/2013 | Adam et al. | | |
| 2014/0050372 A1* | 2/2014 | Qi | ....................... | G06V 10/772 |
| | | | | 382/118 |
| 2015/0131872 A1* | 5/2015 | Ganong | ............ | G06Q 30/0241 |
| | | | | 382/118 |
| 2017/0034097 A1* | 2/2017 | Zhang | ..................... | H04L 51/18 |
| 2017/0262695 A1* | 9/2017 | Ahmed | ................. | G06V 10/82 |
| 2021/0406524 A1* | 12/2021 | Pang | .................... | G06K 9/6218 |
| 2022/0067350 A1* | 3/2022 | Jin | ...................... | G06V 40/171 |
| 2022/0180661 A1* | 6/2022 | Gu | ........................... | G06K 9/62 |

OTHER PUBLICATIONS

Indian Office Action dated Jan. 7, 2022 in Indian Patent Application No. 202144002967, 5 pages.

\* cited by examiner

METHOD AND DEVICE FOR IDENTIFYING
FACE, AND COMPUTER-READABLE
STORAGE MEDIUM

CROSS-REFERENCE TO RELATED APPLICATIONS

This application is based on and claims benefit of priority to Chinese Application No. 202010600155.4 filed on Jun. 28, 2020, the disclosure of which is hereby incorporated by reference in its entirety.

BACKGROUND

Algorithms for identifying a face have found an increasingly wide range of applications, and have a major value in industrial applications. In a scene of application, there often may be only a single picture or very few pictures in each user category of a database of images for retrieval, leading to low diversity of retrievals from the database of images for retrieval. This can greatly impact accuracy in face identification.

SUMMARY

The subject disclosure relates to the field of image processing. Embodiments herein provide a method and device for identifying a face, and a computer-readable storage medium.

According to an aspect herein, a method for identifying a face can include receiving multiple images to be identified, each of the multiple images including a face image part, and extracting each face image of face images in the multiple images to be identified. The method can further include determining an initial figure identification result of identifying a figure in the each face image by matching a face in the each face image respectively to a face in a target image in an image identification library, grouping the face images, and determining a target figure identification result for each face image in each group according to the initial figure identification result for the each face image in the each group.

According to an aspect herein, a device for identifying a face includes a processor and memory. The memory is configured for storing instructions executable by the processor. The processor is can be configured for receiving multiple images to be identified, each of the multiple images including a face image part, and extracting each face image of face images in the multiple images to be identified. The processor can be further configured for determining an initial figure identification result of identifying a figure in the each face image by matching a face in the each face image respectively to a face in a target image in an image identification library, grouping the face images, and determining a target figure identification result for each face image in each group according to the initial figure identification result for the each face image in the each group.

According to an aspect herein, a non-transitory computer-readable storage medium has stored therein computer program instructions which, when executed by a processor, implement a method herein.

The above general description and elaboration below are exemplary and explanatory, and should not be construed to limit the subject disclosure.

BRIEF DESCRIPTION OF THE ACCOMPANYING DRAWINGS

Drawings here are incorporated in and constitute part of the subject disclosure, illustrate exemplary embodiments according to the subject disclosure, and together with the subject disclosure, serve to explain the principle of the subject disclosure.

DETAILED DESCRIPTION

Figure 1:
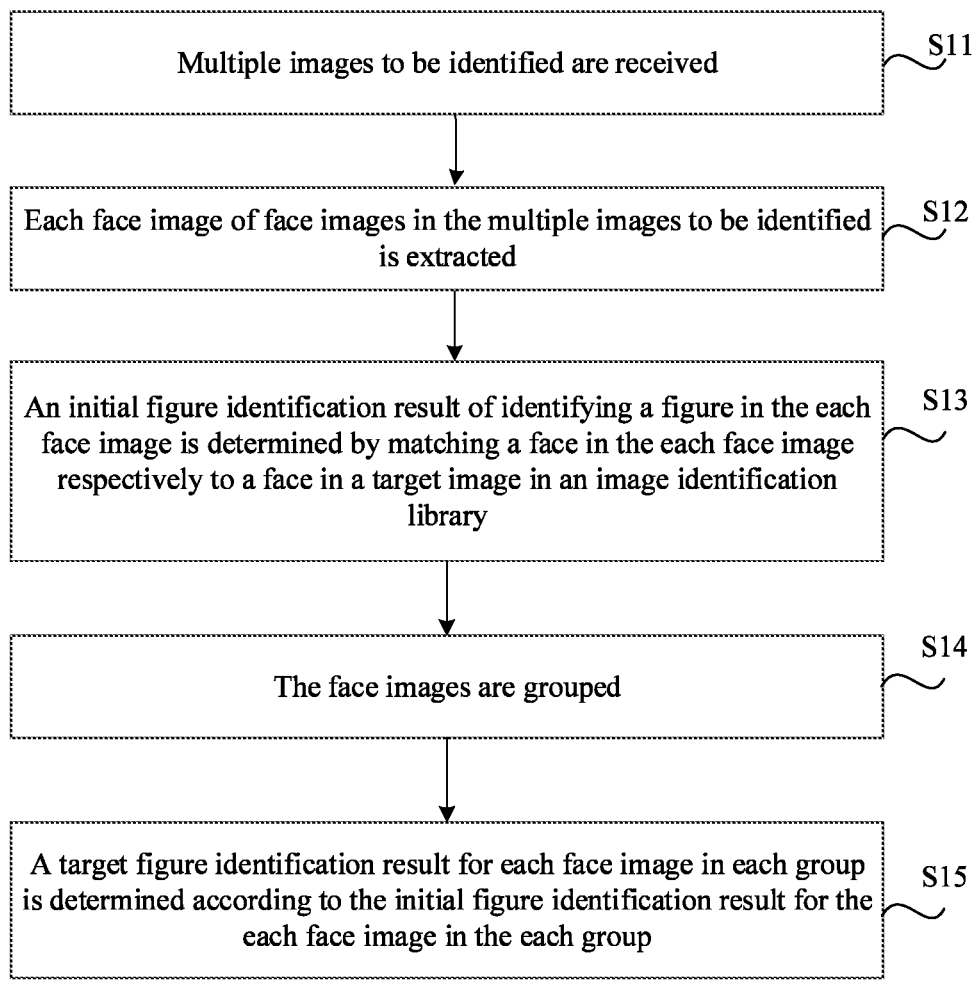
FIG. 1 is a flowchart of a method for identifying a face according to an exemplary embodiment.

Exemplary embodiments, examples of which are illustrated in the accompanying drawings, are elaborated below. The following description refers to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are mere examples of the apparatus (i.e., device/equipment/terminal) and method in accordance with certain aspects of the subject disclosure as recited in the accompanying claims. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

It should be noted that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details. Alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), etc. A terminal may be equipment or a chip provided therein that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

FIG. 1 is a flowchart of a method for identifying a face according to an exemplary embodiment. As shown in FIG. 1, the method includes the following actions.

In S11, multiple images to be identified are received. Each of the multiple images includes a face image part. The multiple images to be identified may be multiple images to be identified when a user organizes a photo album in a mobile phone. Such images to be identified may include very few figures (people). A time span corresponding to the people may be long.

The multiple images to be identified may be images generated in a large-scale event such as corporate team building. In this scene, there may be many people in such images to be identified. Furthermore, when an image to be identified is a group photo including too many people, a factor such as image capture, lighting, an angle, etc., may have a major impact on identification of a face in the image to be identified.

In S12, each face image of face images in the multiple images to be identified is extracted. Each face image in an image to be identified may be detected and extracted based on an existing face detection algorithm, such as seetaface, mtcnn, and the like.

In S13, an initial figure identification result of identifying a figure in the each face image is determined by matching a face in the each face image respectively to a face in a target image in an image identification library. A target image in an image identification library may be uploaded by a user of a number of users and correspond to the user. Therefore, it may be determined whether a face image in an image to be identified matches a target image by comparing the face image to the target image, thereby determining an initial figure identification result for the face image.

In S14, the face images are grouped. Exemplarily, face images in one group may correspond to one figure.

In S15, a target figure identification result for each face image in each group is determined according to the initial figure identification result for the each face image in the each group. Feature images may be grouped based on a feature of each face image in images to be identified. Accordingly, an identification result for a face image in a group may be corrected based on both a feature of a target image in an image identification library and features of images to be identified.

With embodiments herein, multiple images to be identified are received. Each of the multiple images includes a face image part. Each face image of face images in the multiple images to be identified is extracted. An initial figure identification result of identifying a figure in the each face image is determined by matching a face in the each face image respectively to a face in a target image in an image identification library. The face images are grouped. A target figure identification result for each face image in each group is determined according to the initial figure identification result for the each face image in the each group. With a solution herein, an initial figure identification result for a face image in an image to be identified may be determined through a target image in an image identification library, thereby ensuring that the image to be identified matches the target image in the image identification library. Furthermore, by grouping face images in images to be identified, the initial figure identification result may be corrected combining features of images to be identified. Accordingly, when there are very few target images in the image identification library or target images in the image identification library are simple, an identification result for a face image is corrected based on relation among face images in images to be identified, thereby widening a scope to which the method for identifying a face applies, improving accuracy in face identification.

To allow a person having ordinary skill in the art to better understand a solution herein, an aforementioned option is elaborated below.

Figure 2:
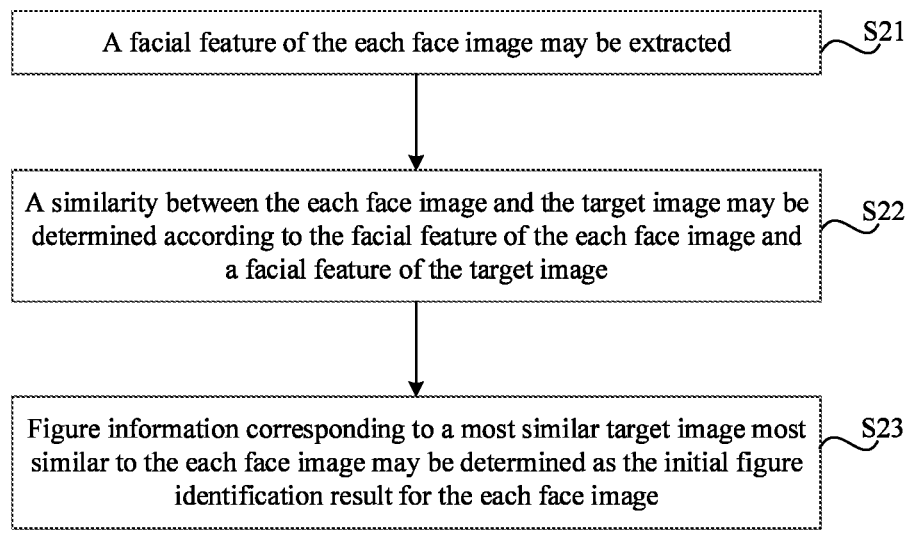
FIG. 2 is a flowchart of determining an initial figure identification result of identifying a figure in the each face image by matching a face in the each face image respectively to a face in a target image in an image identification library according to an exemplary embodiment.

In S13, the initial figure identification result for the each face image may be determined by matching the face in the each face image respectively to the face in the target image in the image identification library as follows. As shown in FIG. 2, the option may include an option as follows.

In S21, a facial feature of the each face image may be extracted. A feature extraction model may be trained in advance based on a neural network. Accordingly, a facial feature of an extracted face image may be extracted based on the feature extraction model. Exemplarily, a feature of a fully connected layer of the feature extraction model may be used as the facial feature.

In a scene of application, face image parts in different images to be identified may differ in size. Accordingly, when a facial feature of an extracted face image is extracted directly based on a feature extraction model, a feature may be fuzzy or missing. Therefore, embodiments as follows are further provided herein.

The facial feature of the each face image may be extracted as follows. The option may include an option as follows. A key point corresponding to the each face image may be acquired by performing key point extraction on the each face image. A key point corresponding to a face image may be extracted through an existing key point extraction algorithm such as Ensemble of Regression Tress (ERT), Mnemonic Descent Method (MDM), etc.

A target face image may be acquired by correcting the each face image according to the key point. The facial feature corresponding to the each face image may be acquired by performing feature extraction according to the target face image. The face image may be a profile image taken from the side of a human face. Accordingly, a face image may be corrected according to a key point thereof by adjusting the key point of the face image according to a relation among locations of key points in a standard image. Exemplarily, the standard image may be a face image taken from the front, as preset by a user. Accordingly, the profile image may be converted into the face image taken from the front, acquiring the target face image, facilitating subsequent accurate extraction of a facial feature.

If a face image is large, the face image may be corrected according to a key point thereof by reducing the size of the face image according to key points in a standard image and the key point of the face image, thereby acquiring a target face image of a size same as the standard image. Similarly, if a face image is small, the face image may be corrected according to a key point thereof by enlarging the face image according to key points in a standard image and the key point of the face image, thereby acquiring a target face image of a size same as the standard image. In this way, it is ensured that a standard face image is input in subsequent facial feature extraction, thereby ensuring applicability of a feature extraction model, improving accuracy of an extracted facial feature.

A location, a size, and the like, of a face image may also be corrected through key points in a standard image, specifically in a mode as elaborated, which is not repeated here. Then, a facial feature may be extracted through a feature extraction model based on such a standardized target face image. For example, a feature of a fully connected layer of the feature extraction model may be used as the facial feature. In this way, with a solution herein, standardization correction is performed on a face image extracted from an image to be identified, acquiring a standardized target face image. Then, a facial feature is extracted based on the target face image, ensuring adaptability of the target face image and the feature extraction model effectively, thereby effectively improving accuracy of an extracted facial feature. Furthermore, the method for identifying a face may be used to identify a face in images to be identified taken from various angles or an image to be identified including many people, thereby widening a scope to which the method for identifying a face applies.

Then, returning to FIG. 2, in S22, a similarity between the each face image and the target image may be determined according to the facial feature of the each face image and a facial feature of the target image.

Exemplarily, after a facial feature of a face image has been determined, a Euclidean distance D between the facial feature and a facial feature of a target image may be computed. Then, the similarity may be 1-D. A Euclidean distance between features may be computed according to prior art, which is not repeated here.

A facial feature of a target image may be extracted in advance in an aforementioned facial feature extraction mode, acquiring a standardized facial feature corresponding to the target image, so as to match and identify an image to be identified, ensuring accuracy in face identification.

In S23, figure information corresponding to a most similar target image most similar to the each face image may be determined as the initial figure identification result for the each face image. According to how the similarity is computed in the example, a most similar target image most similar to a face image may be a target image with a maximal similarity to the face image. That is, figure information corresponding to a target image with a minimal distance to the face image may be determined as the initial figure identification result for the face image, thereby implementing preliminary identification of the face image.

Figure 3:
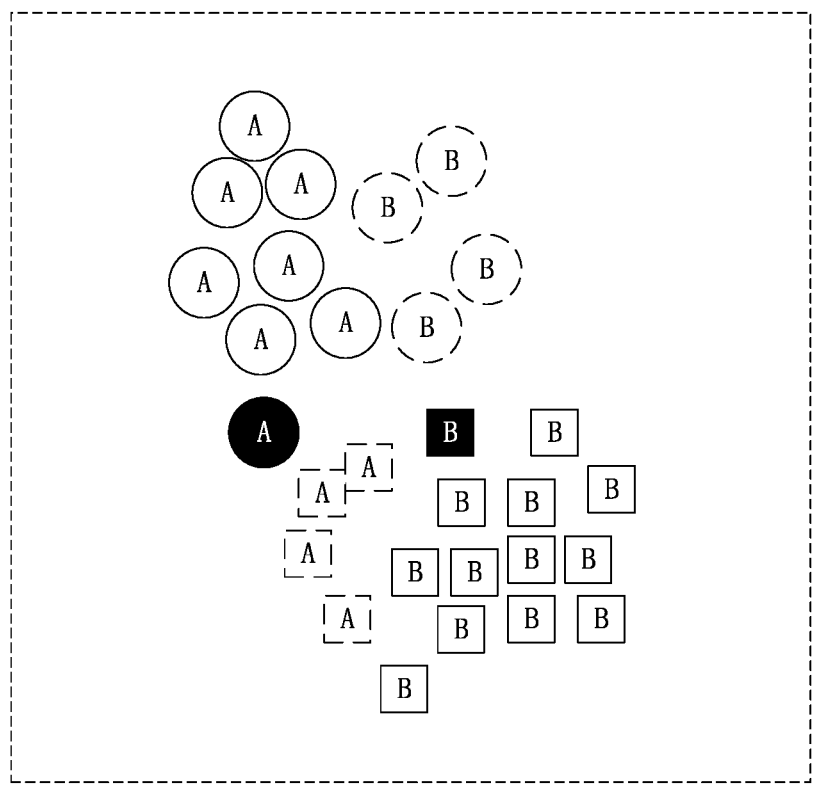
FIG. 3 is a diagram of distribution of face images in multiple images to be identified.

As an example, FIG. 3 is a diagram of distribution of face images in multiple images to be identified. A circle may be used to represent a face image of an actual user A. A square may be used to represent a face image of an actual user B. FIG. 3 may represent initial figure identification results for face images. A letter A or B in a white shape (circle or square) may be used to represent an initial figure identification result for the face image. Black shapes may be used to represent target images of the users A and B in the image identification library.

As another example, in a scene of application, a target image mostly likely may be an old image of the user A. Therefore, an identification result may be wrong based on how identification is done as described. As shown in FIG. 3, a dotted shape may show a face image with a wrong initial figure identification result. Therefore, to avoid the problem effectively, herein, a face image in images to be identified may be identified accurately through S14 and S15 as well as a feature relating to the images to be identified.

In S14, the face images may be grouped as follows. A facial feature of each face image may be extracted, specifically in a mode as elaborated, which is not repeated here. Then, the multiple images to be identified may be clustered based on the facial feature. Face images corresponding to facial features belonging to one cluster may be put into one group.

Figure 4:
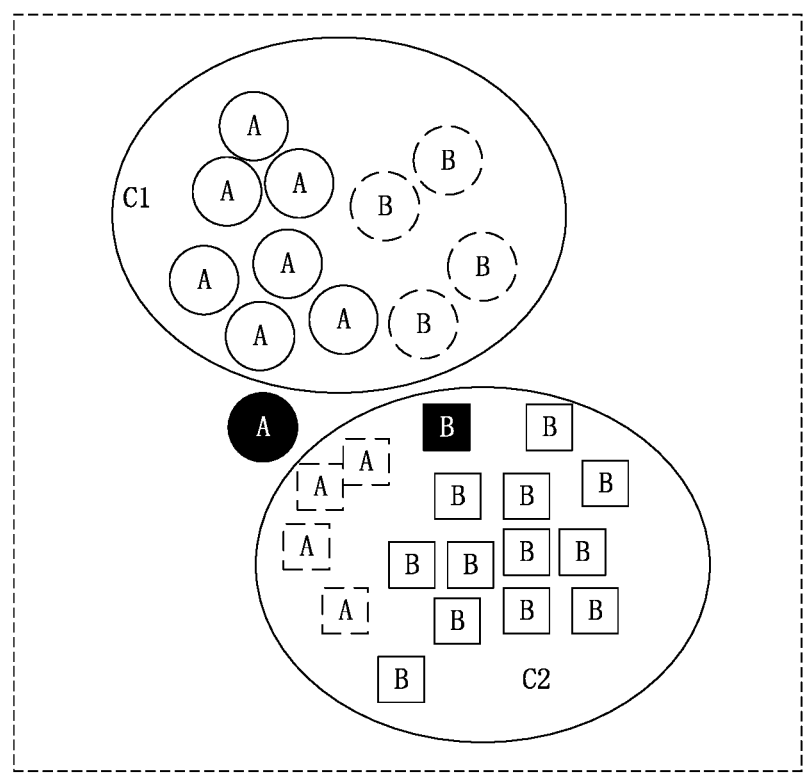
FIG. 4 is a diagram of distribution of face images in multiple images to be identified.

As an example, a Euclidean distance between two facial features may be computed, thereby performing clustering by K-Means clustering or hierarchical clustering, which is not limited herein. With a solution herein, face images may be clustered based on facial features thereof. Clusters of clustered face images are shown in FIG. 4. C1 and C2 may correspond to different clusters, respectively. In this way, with a solution herein, a face image in images to be identified is processed. Face images may be classified based on facial features in the images to be identified. Face images corresponding to one figure may be put in one group, facilitating subsequent correction of an identification result for a face image in the images to be identified, providing data supporting accuracy in face identification.

In S15, the target figure identification result for the each face image in the each group may be determined according to the initial figure identification result for the each face image in the each group as follows. One or more figures corresponding to the each group and a count of each of the one or more figures may be determined according to the initial figure identification result for the each face image in the each group. A figure with a maximal count may be determined as a target figure. Information on the target figure may be determined as the target figure identification result for the each face image in the each group.

Figure 5:
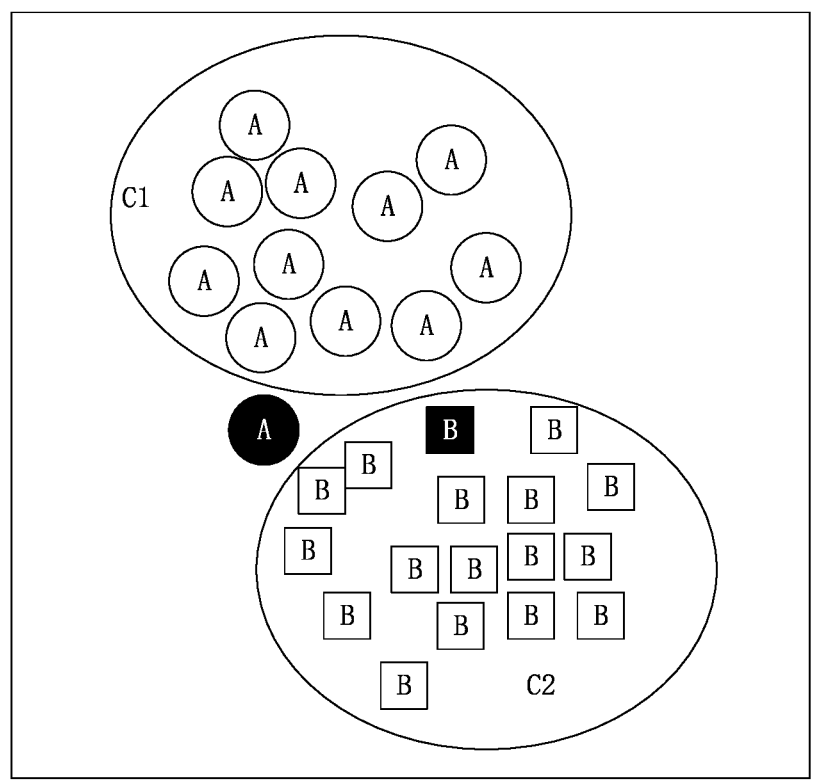
FIG. 5 is a diagram of distribution of face images in multiple images to be identified.

As shown in FIG. 3, a group C1 may correspond to a figure A and a figure B. A count of the figure A may be 7. A count of the figure B may be 4. Therefore, the figure A may be determined as the target figure. The figure A may be determined as the target figure identification result for each face image in the group C1. Similarly, it may be determined that a group C2 corresponds to a figure A and a figure B. A count of the figure A may be 4. A count of the figure B may be 12. Therefore, the figure B may be determined as the target figure. The figure B may be determined as the target figure identification result for the each face image in the group C2. The target figure identification result for face images in FIG. 3 determined as such is shown in FIG. 5. That is, a target figure identification result for a face image in the group C1 with an initial figure identification result of B may be corrected to be A. A target figure identification result for a face image in the group C2 with an initial figure identification result of A may be corrected to be B. Accordingly, face images corresponding to the figure A and the figure B may be identified accurately.

In this way, with a solution herein, face images are grouped, thereby putting similar face images in one group. Then, a figure with a maximal count in a group may be determined through a voting algorithm, ensuring accuracy of a determined target figure. Furthermore, an identification result for a face image in the group is corrected via information on the target figure, effectively improving accuracy of an identification result for a face image in the group. In addition, by grouping, initial figure identification results for face images may be corrected in batch, thereby improving efficiency in face identification, further improving user experience.

The method may further include an option as follows. An image to be identified, to which the each face image in the each group belongs, and a target figure identification result corresponding to the each group, may be output, respectively. A target figure identification result corresponding to a group may be the target figure identification result corresponding to any face image in the group.

After a face image has been extracted from an image to be identified, the correspondence between the face image and the image to be identified may be recorded. Therefore, after a target figure identification result for any face image in a group has been determined, an image to be identified, to which a face image in the group belongs, and the target figure identification result corresponding to the group, may be output, respectively. According to the example, an image to be identified to which a face image in the group C1 belongs and a target figure identification result corresponding to the group C1, namely information on the figure A, may be output. Exemplarily, an image to be identified may be labeled with a face image indicated by the target figure identification result. The group C2 may be output similarly, which is not repeated here.

A selection instruction input by a user may be received. In response to the selection instruction, an image in images to be identified that contains information on a figure indicated by the selection instruction may be output. For example, the user may specify to output an image in images to be identified that contains information on a figure A. Accordingly, after the target figure identification result for each face image has been determined, an image to be identified, to which a face image with the target figure identification result of the figure A belongs, may be output.

An image to be identified, to which a face image in a group belongs, and a target figure identification result corresponding to the group, may be output in a preset order. For example, a user may organize a photo album which may contain images of a user from various historical periods. Then, an age for a face image in the group may be computed based on a current age. Accordingly, images may be output in an order of ascending ages. What described is merely exemplary, and does not limit the subject disclosure.

In this way, with a solution herein, a face in an image to be identified is identified. Then, images to be identified may be output based on identification results of the images to be identified according to classification of target figure identification results, thereby allowing a user to distinguish an image corresponding to each target figure in the images to be identified, and sort and output the images to be identified, effectively reducing a sorting operation of the user, improving user experience.

The method may further include an option as follows. The target figure identification result for the each face image in the multiple images to be identified may be output, respectively. Each face image in the images to be identified may be labeled with the target figure identification result, i.e., information on the target figure. Exemplarily, the labeling may be performed using a face frame. Information on the target figure may be the name or ID of the target figure. In this way, a user may quickly determine each figure included in an image to be identified based on results output, allowing the user to distinguish figures in the image to be identified, while increasing diversity of results output by a face identification method herein, thereby widening a scope to which the method for identifying a face applies.

Figure 6:
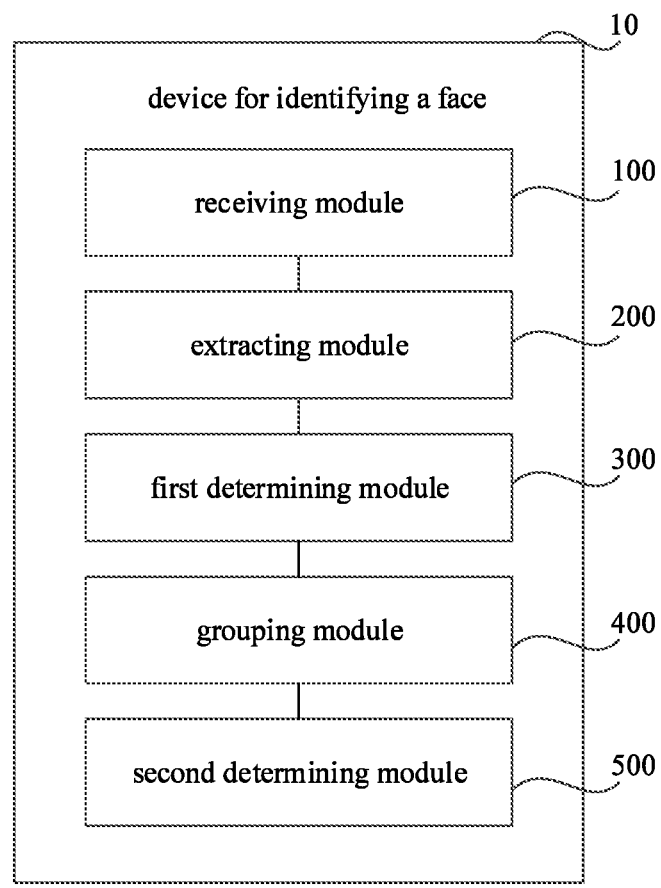
FIG. 6 is a block diagram of a device for identifying a face according to an exemplary embodiment.

Embodiments herein further provide a device for identifying a face. As shown in FIG. 6, the device 10 includes a receiving module 100, an extracting module 200, a first determining module 300, a grouping module 400, and a second determining module 500. Of course, it should be understood that one or more of the modules described in this specification can be implemented by circuitry.

The receiving module 100 is configured for receiving multiple images to be identified. Each of the multiple images includes a face image part. The extracting module 200 is configured for extracting each face image of face images in the multiple images to be identified. The first determining module 300 is configured for determining an initial figure identification result of identifying a figure in the each face image by matching a face in the each face image respectively to a face in a target image in an image identification library.

The grouping module 400 is configured for grouping the face images. The second determining module 500 is configured for determining a target figure identification result for each face image in each group according to the initial figure identification result for the each face image in the each group. The grouping module may include a feature extracting sub-module and a clustering sub-module. The feature extracting sub-module may be configured for extracting a facial feature of each face image.

The clustering sub-module may be configured for clustering the multiple images to be identified based on the facial feature, and putting face images corresponding to facial features belonging to one cluster into one group.

The first determining module may include a feature extracting sub-module, a first determining sub-module, and a second determining sub-module. The feature extracting sub-module may be configured for extracting a facial feature of the each face image. The first determining sub-module may be configured for determining a similarity between the each face image and the target image according to the facial feature of the each face image and a facial feature of the target image.

The second determining sub-module may be configured for determining figure information corresponding to a most similar target image most similar to the each face image as the initial figure identification result for the each face image. The feature extracting sub-module may include a first extracting sub-module, a correcting sub-module, and a second extracting sub-module. The first extracting sub-module may be configured for acquiring a key point corresponding to the each face image by performing key point extraction on the each face image. The correcting sub-module may be configured for acquiring a target face image by correcting the each face image according to the key point.

The second extracting sub-module may be configured for acquiring the facial feature corresponding to the each face image by performing feature extraction according to the target face image. The second determining module may include a third determining sub-module, a fourth determining sub-module, and a fifth determining sub-module. The third determining sub-module may be configured for determining one or more figures corresponding to the each group and a count of each of the one or more figures according to the initial figure identification result for the each face image in the each group. The fourth determining sub-module may be configured for determining a figure with a maximal count as a target figure. The fifth determining sub-module may be configured for determining information on the target figure as the target figure identification result for the each face image in the each group.

The device may further include a first output module. The first output module may be configured for respectively outputting an image to be identified to which the each face image in the each group belongs and a target figure identification result corresponding to the each group.

The device may further include a second output module. The second output module may be configured for respectively outputting the target figure identification result for the each face image in the multiple images to be identified.

A module of the device according to at least one embodiment herein may perform an operation in a mode elaborated in at least one embodiment of the method herein, which will not be repeated here.

According to an embodiment herein, a non-transitory computer-readable storage medium has stored thereon computer program instructions which, when executed by a processor, implement an option in a method for identifying a face herein.

Figure 7:
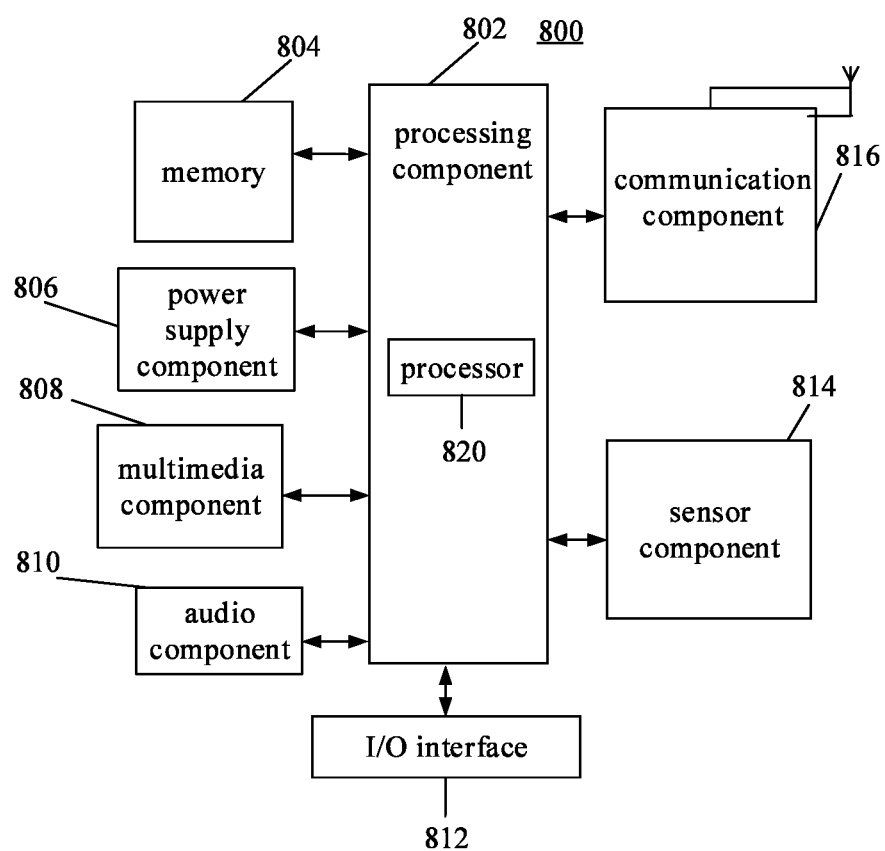
FIG. 7 is a block diagram of a device for identifying a face according to an exemplary embodiment.

FIG. 7 is a block diagram of a device 800 for identifying a face according to an exemplary embodiment. For example, the device 800 may be a mobile phone, a computer, digital broadcasting UE, a message transceiver, a game console, tablet equipment, medical equipment, fitness equipment, a personal digital assistant, etc.

Referring to FIG. 7, the device 800 may include at least one of a processing component 802, memory 804, a power supply component 806, a multimedia component 808, an audio component 810, an Input/Output (I/O) interface 812, a sensor component 814, or a communication component 816.

The processing component 802 may generally control an overall operation of the device 800, such as operations associated with display, a telephone call, data communication, a camera operation, a recording operation, and the like. The processing component 802 may include one or more processors 820 to execute instructions so as to complete all or part of the options of an aforementioned method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 may be configured for storing various types of data to support the operation at the device 800. Examples of such data may include instructions of any application or method configured for operating on the device 800, contact data, phonebook data, messages, pictures, videos, and the like. The memory 804 may be actualized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, and the like.

The power supply component 806 may supply electric power to various components of the device 800. The power supply component 806 may include a power management system, one or more power sources, and other components related to generating, managing, and distributing electricity for the device 800.

The multimedia component 808 may include a screen that provides an output interface between the device 800 and a user. The screen may include a Liquid Crystal Display (LCD) and a Touch Panel (TP). If the screen may include a TP, the screen may be actualized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 808 may include at least one of a front camera or a rear camera. When the device 800 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 810 may be configured for outputting and/or inputting an audio signal. For example, the audio component 810 may include a microphone (MIC). When the device 800 is in an operation mode such as a call mode, a recording mode, a voice identification mode, and the like, the MIC may be configured for receiving an external audio signal. The received audio signal may be further stored in the memory 804 or may be sent via the communication component 816. The audio component 810 may further include a loudspeaker configured for outputting the audio signal.

The I/O interface 812 may provide an interface between the processing component 802 and a peripheral interface module. Such a peripheral interface module may be a keypad, a click wheel, a button, and the like. Such a button may include but is not limited to at least one of a homepage button, a volume button, a start button, or a lock button.

The sensor component 814 may include one or more sensors for assessing various states of the device 800. For example, the sensor component 814 may detect an on/off state of the device 800 and relative location of components such as the display and the keypad of the device 800. The sensor component 814 may further detect a change in the location of the device 800 or of a component of the device 800, whether there is contact between the device 800 and a user, the orientation or acceleration/deceleration of the device 800, a change in the temperature of the device 800, and the like. The sensor component 814 may include a proximity sensor configured for detecting existence of a nearby object without physical contact. The sensor component 814 may further include an optical sensor such as a Complementary Metal-Oxide-Semiconductor (CMOS) or a Charge-Coupled-Device (CCD) image sensor used in an imaging application. The sensor component 814 may further include an acceleration sensor, a gyroscope sensor, a magnetic sensor, a pressure sensor, a temperature sensor, and the like.

The communication component 816 may be configured for facilitating wired or wireless communication between the device 800 and other equipment. The device 800 may access a wireless network based on any communication standard such as Wi-Fi, 2G, 3G, . . . , or a combination thereof. The communication component 816 may broadcast related information or receive a broadcast signal from an external broadcast management system via a broadcast channel. The communication component 816 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), and the like.

The device 800 may be actualized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, and the like, to implement an aforementioned method.

A transitory or non-transitory computer-readable storage medium including instructions, such as memory 804 including instructions, may be provided. The instructions may be executed by the processor 820 of the device 800 to implement an aforementioned method. For example, the computer-readable storage medium may be Read-Only Memory (ROM), Random Access Memory (RAM), Compact Disc Read-Only Memory (CD-ROM), a magnetic tape, a floppy disk, optical data storage equipment, and the like.

In another exemplary embodiment, a computer program product may include a computer program that can be executed by a device capable of programming. The computer program may have a code part which, when executed by the programming device, implements a method for identifying a face herein.

Figure 8:
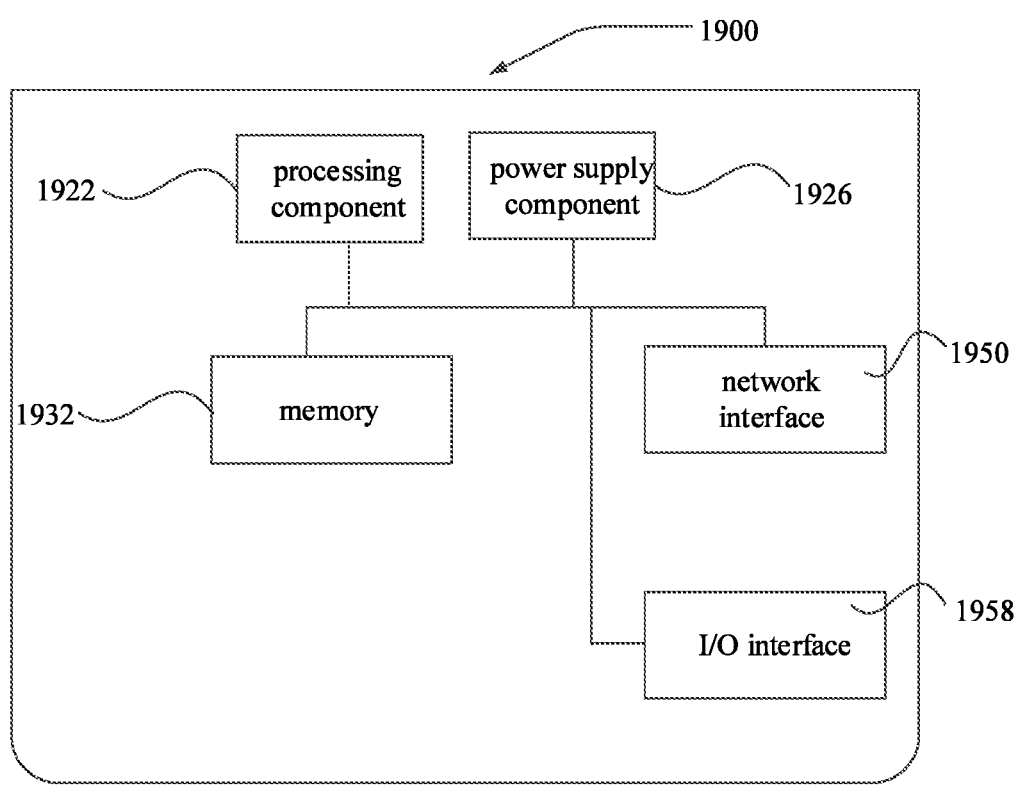
FIG. 8 is a block diagram of a device for identifying a face according to an exemplary embodiment.

FIG. 8 is a block diagram of a device 1900 for identifying a face according to an exemplary embodiment. For example, the device 1900 may be provided as a server. Referring to FIG. 8, the device 1900 may include a processing component 1922. The processing component may include one or more processors. The device may include a memory resource represented by memory 1932. The memory resource may be configured for storing an instruction executable by the processing component 1922, such as an APP. The APP stored in the memory 1932 may include one or more modules. Each of the one or more modules may correspond to a group of instructions. In addition, the processing component 1922 may be configured for executing instructions to perform the method herein.

The device 1900 may further include a power supply component 1926. The power supply component may be configured for managing power of the device 1900. The device may further include a wired or wireless network interface 1950 configured for connecting the device 1900 to a network. The device may further include an Input/Output (I/O) interface 1958. The device 1900 may operate based on an operating system stored in the memory 1932, such as a Windows Server™, a Mac OS X™, a Unix™, a Linux™, a FreeBSD™, and the like.

Further note that herein by "multiple", it may mean two or more. Other quantifiers may have similar meanings. A term "and/or" may describe an association between associated objects, indicating three possible relationships. For example, by A and/or B, it may mean that there may be three cases, namely, existence of but A, existence of both A and B, or existence of but B. A slash mark "I" may generally denote an "or" relationship between two associated objects that come respectively before and after the slash mark. Singulars "a/an", "said" and "the" are intended to include the plural form, unless expressly illustrated otherwise by context.

Further note that although in drawings herein operations are described in a specific or der, it should not be construed as that the operations have to be performed in the specific or der or sequence, or that any operation shown has to be performed in or der to acquire an expected result. Under a specific circumstance, multitask and parallel processing may be advantageous.

Other implementations of the subject disclosure will be apparent to a figure having ordinary skill in the art that has considered the specification and or practiced the subject disclosure. The subject disclosure is intended to cover any variation, use, or adaptation of the subject disclosure following the general principles of the subject disclosure and including such departures from the subject disclosure as come within common knowledge or customary practice in the art. The specification and the embodiments are intended to be exemplary only, with a true scope and spirit of the subject disclosure being indicated by the appended claims.

Note that the subject disclosure is not limited to the exact construction that has been described above and illustrated in the accompanying drawings, and that various modifications and changes can be made to the subject disclosure without departing from the scope of the subject disclosure. It is intended that the scope of the subject disclosure is limited only by the appended claims.

What is claimed is:

1. A method for identifying a face, comprising:
receiving multiple images to be identified, each of the multiple images including a face image part;
extracting each face image of face images in the multiple images to be identified;
determining an initial figure identification result of identifying a figure in the each face image by matching a face in the each face image respectively to a face in a target image in an image identification library;
grouping the face images; and
determining a target figure identification result for each face image in each group based on the initial figure identification result for the each face image in the each group;
wherein determining the target figure identification result for the each face image in the each group according to the initial figure identification result for the each face image in the each group comprises:
determining one or more figures corresponding to the each group and a count of each of the one or more figures according to the initial figure identification result for the each face image in the each group;
determining a figure with a maximal count as a target figure; and
determining information on the target figure as the target figure identification result for the each face image in the each group.

2. The method of claim 1, wherein grouping the face images further comprises:
extracting a facial feature of each face image;
clustering the multiple images to be identified based on the facial feature; and
putting face images corresponding to facial features belonging to one cluster into one group.

3. The method of claim 1, wherein determining the initial figure identification result of identifying the figure in the each face image by matching the face in the each face image respectively to the face in the target image in the image identification library further comprises:
extracting a facial feature of the each face image;

determining a similarity between the each face image and the target image based on the facial feature of the each face image and a facial feature of the target image; and determining figure information corresponding to a most similar target image that is most similar to the each face image as the initial figure identification result for the each face image.

4. The method of claim 2, wherein extracting the facial feature of the each face image further comprises:

acquiring a key point corresponding to the each face image by performing key point extraction on the each face image;

acquiring a target face image by correcting the each face image based on the key point; and acquiring the facial feature corresponding to the each face image by performing feature extraction based on the target face image.

5. The method of claim 4, wherein correcting each face image according to the key point comprises at least one of: correcting a respective location of each face image according to the key point; or correcting a respective size of each face image according to the key point.

6. The method of claim 1, further comprising:

respectively outputting an image to be identified to which the each face image in the each group belongs and a target figure identification result corresponding to the each group.

7. The method of claim 1, further comprising:

respectively outputting the target figure identification result for the each face image in the multiple images to be identified.

8. The method of claim 3, wherein extracting the facial feature of the each face image further comprises:

acquiring a key point corresponding to the each face image by performing key point extraction on the each face image;

acquiring a target face image by correcting the each face image based on the key point; and acquiring the facial feature corresponding to the each face image by performing feature extraction according to the target face image.

9. A device for identifying a face, comprising a processor and memory that is configured to store instructions executable by the processor, wherein the processor is configured to perform operations comprising:

receiving multiple images to be identified, each of the multiple images including a face image part;

extracting each face image of face images in the multiple images to be identified;

determining an initial figure identification result of identifying a figure in the each face image by matching a face in the each face image respectively to a face in a target image in an image identification library;

grouping the face images; and determining a target figure identification result for each face image in each group based on the initial figure identification result for the each face image in the each group;

wherein the processor is specifically configured for:

determining one or more figures corresponding to the each group and a count of each of the one or more figures according to the initial figure identification result for the each face image in the each group;

determining a figure with a maximal count as a target figure; and determining information on the target figure as the target figure identification result for the each face image in the each group.

10. The device of claim 9, wherein the processor is configured to perform operations further comprising:

extracting a facial feature of each face image;

clustering the multiple images to be identified based on the facial feature; and putting face images corresponding to facial features belonging to one cluster into one group.

11. The device of claim 9, wherein the processor is configured to perform operations further comprising:

extracting a facial feature of the each face image;

determining a similarity between the each face image and the target image based on the facial feature of the each face image and a facial feature of the target image; and determining figure information corresponding to a most similar target image that is most similar to the each face image as the initial figure identification result for the each face image.

12. The device of claim 10, wherein the processor is configured to perform operations further comprising:

acquiring a key point corresponding to the each face image by performing key point extraction on the each face image;

acquiring a target face image by correcting the each face image according to the key point; and acquiring the facial feature corresponding to the each face image by performing feature extraction based on the target face image.

13. The device of claim 12, wherein correcting each face image according to the key point comprises at least one of: correcting a respective location of each face image according to the key point; or correcting a respective size of each face image according to the key point.

14. The device of claim 9, wherein the processor is configured to perform operations further comprising:

respectively outputting an image to be identified to which the each face image in the each group belongs and a target figure identification result corresponding to the each group.

15. The device of claim 9, wherein the processor is configured to perform operations further comprising:

respectively outputting the target figure identification result for the each face image in the multiple images to be identified.

16. The device of claim 11, wherein the processor is configured to perform operations further comprising:

acquiring a key point corresponding to the each face image by performing key point extraction on the each face image;

acquiring a target face image by correcting the each face image according to the key point; and acquiring the facial feature corresponding to the each face image by performing feature extraction based on the target face image.

17. A non-transitory computer-readable storage medium, having stored therein computer program instructions which, when executed by a processor, cause the processor to implement operations comprising:

receiving multiple images to be identified, each of the multiple images including a face image part;

extracting each face image of face images in the multiple images to be identified;

determining an initial figure identification result of identifying a figure in the each face image by matching a face in the each face image respectively to a face in a target image in an image identification library;

grouping the face images; and determining a target figure identification result for each face image in each group based on the initial figure identification result for the each face image in the each group;

wherein deter lining the target figure identification result for the each face image in the each group according to the initial figure identification result for the each face image in the each group comprises:

determining one or more figures corresponding to the each group and a count of each of the one or more figures according to the initial figure identification result for the each face image in the each group;

determining a figure with a maximal count as a target figure; and determining information on the target figure as the target figure identification result for the each face image in the each group.

18. The storage medium of claim 17, wherein grouping the face images further comprises:

extracting a facial feature of each face image;

clustering the multiple images to be identified based on the facial feature; and putting face images corresponding to facial features belonging to one cluster into one group.

19. The storage medium of claim 17, wherein determining the initial figure identification result of identifying the figure in the each face image by matching the face in the each face image respectively to the face in the target image in the image identification library further comprises:

extracting a facial feature of the each face image;

determining a similarity between the each face image and the target image base on the facial feature of the each face image and a facial feature of the target image; and determining figure information corresponding to a most similar target image most similar to the each face image as the initial figure identification result for the each face image.

20. The storage medium of claim 18, wherein extracting the facial feature of the each face image comprises:

acquiring a key point corresponding to the each face image by performing key point extraction on the each face image;

acquiring a target face image by correcting the each face image according to the key point; and acquiring the facial feature corresponding to the each face image by performing feature extraction based on the target face image.

\* \* \* \* \*